Sept. 11, 1956      L. HANSON      2,762,204
AUTOMATIC SERVICE VALVES FOR USE IN REFRIGERATION SYSTEMS
Filed Dec. 13, 1952      2 Sheets-Sheet 2
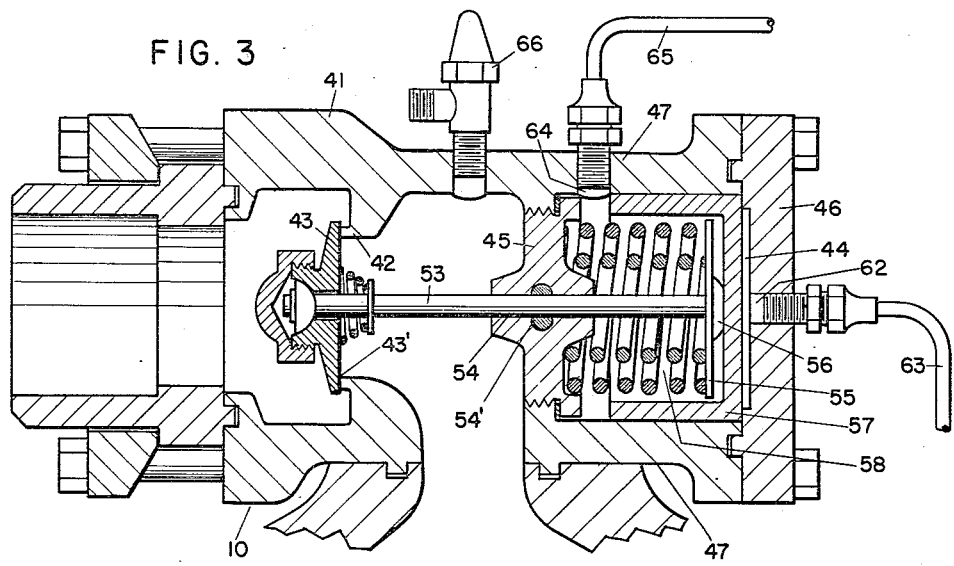
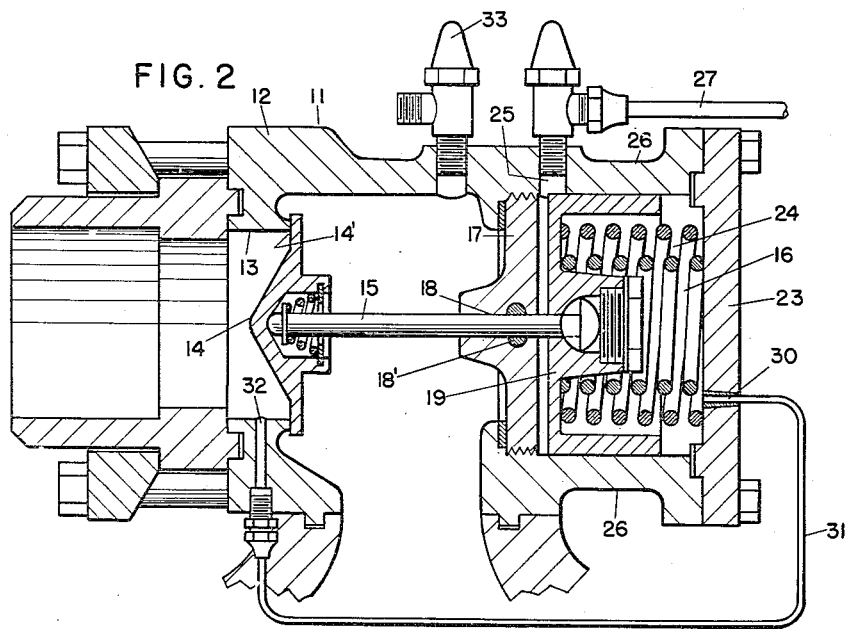
INVENTOR.
Lars Hanson
BY Herman Seid
Atty.

United States Patent Office 2,762,204
Patented Sept. 11, 1956

2,762,204

AUTOMATIC SERVICE VALVES FOR USE IN REFRIGERATION SYSTEMS

Lars Hanson, Syracuse, N. Y., assignor to Carrier Corporation, Syracuse, N. Y., a corporation of Delaware Application December 13, 1952, Serial No. 325,839

7 Claims. (Cl. 62—3)

This invention relates to valves and, more particularly, to automatically operable valves for use in a refrigeration system to prevent flow of refrigerant to or from the compressor of the system during shut-down and to permit repair or replacement of the compressor if desired without great loss of expensive refrigerant.

A major cause of compressor failure in the past has been the dilution of the lubrication oil by absorbed or condensed refrigerant during shut-down so that excessive foaming is encountered during start-up which prevents the supply of sufficient lubricant to the various parts of the compressor during operation. Heretofore, attempts were made to solve this problem by the use of manual service valves. In actual use, however, manual service valves are not effective for frequently the operator of the refrigeration system forgets or fails to use them.

I have eliminated this problem by the use of improved service valves automatically operable when the system is shutdown to prevent flow of refrigerant into the compressor thus preventing excessive dilution of lubricant in the crankcase by refrigerant to assure a sufficient supply of lubricant at start-up for circulation to the various parts of the compressor.

The chief object of the present invention is to provide a service valve automatically operable upon shut-down to prevent excessive dilution of the lubrication oil in the crank case of the compressor of a refrigeration system.

An object of the invention is to provide a refrigeration system including service valves automatically operable upon shut-down to prevent passage of refrigerant into the compressor of the system.

A further object of the invention is to provide a refrigeration system including a discharge service valve arranged to unseat during shut-down in the event internal compressor pressure exceeds the system pressure by a predetermined amount to relieve such pressure.

Another object of the invention is to provide a refrigeration system including a suction valve that will remain closed during shut-down even if the system pressure exceeds the internal compressor pressure.

A still further object of the invention is to provide a service valve which will protect the compressor of a refrigeration system against flooded start-ups thus eliminating extra equipment used for such purposes. Other objects of my invention will be readily perceived from the following description.

This invention relates to a valve structure including, in combination, a housing having a passage therethrough, means to close the passage, yieldable means disposed in the housing to hold said first means in closed position, and means in the housing responsive to the lubricant pressure of a compressor lubrication system to overcome the yieldable means and move the first means to open the passage.

This invention further relates to a refrigeration system including in combination a compressor, a condenser, a discharge line connecting the compressor and the condenser, expansion means, and evaporator, a suction line connecting the evaporator and the compressor, a valve in at least one of the lines adjacent the compressor, said valve including a housing having a passage therethrough, means to close the passage, second means disposed in the housing to hold the first means in closed position, and means in the housing responding to the lubricant pressure of a compressor lubrication system to move the first means to open position against the resistance of said second means.

The attached drawing illustrates a preferred embodiment of my invention, in which—

Figure 2 is a sectional view of an automatic suction service valve; and

Figure 3 is a sectional view of an automatic discharge service valve.

Figure 1:
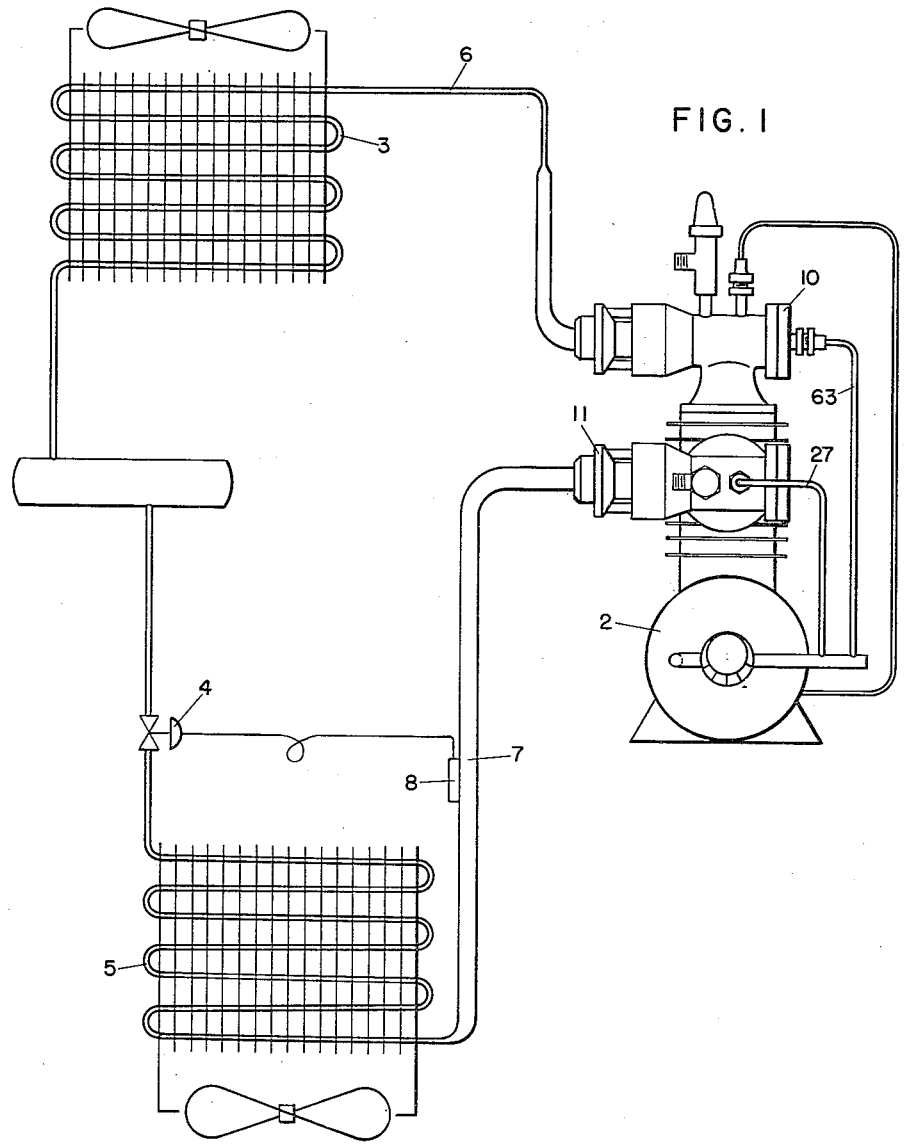
Figure 1 is a diagrammatic view of a refrigeration system including the service valves of the invention.

Referring to the drawings and particularly to Figure 1, there is shown a refrigeration system including a compressor 2, a condenser 3, expansion means 4, and an evaporator 5. A discharge line 6 connects the compressor 2 and the condenser 3. An automatic discharge service valve 10 is placed in line 6 adjacent the compressor. A suction line 7 connects the evaporator 5 and compressor 2. An automatic suction service valve 11 is placed in line 7 adjacent the compressor. A thermostatic bulb 8 is disposed in contact with the suction line 7 adjacent the compressor to regulate the flow of refrigerant through the expansion means 4.

Referring particularly to Figure 2, there are disclosed the details of the automatic suction service valve 11. The suction valve 11 includes a housing 12. A passage 13 through the housing 12 permits communication between the refrigeration system and the compressor. A self-aligned valve disk or member 14 cooperates with port 14' to regulate flow of refrigerant through passage 13. This disk or member 14 is connected to an element such as rod 15 which extends into chamber 16. The chamber 16, which is disposed in the housing 12 opposite the port 14', includes front wall 17, back wall 23, and cylindrical wall 26. The front wall 17 of the chamber 16 has an aligning opening 18 therein through which the rod 15 passes into the chamber. In this aligning opening 18 there is a seal 18', which prevents flow of gas from chamber 16 into the compressor suction passage.

In the chamber 16, the rod 15 is connected to piston 19. Disposed between the piston 19 and back wall 23 of the chamber is a valve closing spring 24. An opening 25 is provided in the cylindrical wall 26 of the chamber 16. This opening is positioned adjacent the juncture of front wall 17 with cylindrical wall 26. The opening is in communication with a pipe 27 which leads to the oil pump (not shown) of the compressor lubrication system.

In the back wall 23 of the chamber, there is an opening 30 that will permit oil in the chamber to flow through pipe 31 to an opening 32 in the housing 12. This opening 32 is connected to passage 13 adjacent port 14'. A suction pressure gauge connection 33 is shown disposed in the housing 12 to permit a pressure gauge to be connected thereto, if desired.

Considering the operation of the automatic suction service valve 11, the valve closing spring 24 acts against piston 19 to hold the member 14 in closed position to prevent refrigerant from passing through the port 14' when the compressor is not running. When the compressor is started up, oil is supplied to the chamber 16 through opening 25. This oil comes from the oil pump (not shown) of the compressor lubrication system. It enters the chamber between the front wall 17 and the piston 19. Thus, this oil will tend to act against the piston to enable it to overcome the force of the spring 24.

When the compressor attains its running speed, the oil pressure from the oil pump of the compressor lubrication system will exert sufficient force against piston 19 to overcome the force of spring 24 to move the member 14 away from port 14' permitting refrigerant to flow from the system to the compressor.

If any oil leaks past the piston, the opening 30 in wall 23 serves as an equalizer since this oil will flow through pipe 31 and opening 32 into the incoming refrigerant, which will carry it back to the compressor.

From Figure 2 it will be seen that if upon shut-down the system pressure exceeds the internal compressor pressure the valve will remain closed. This is due to communication by pipe 31 between passage 13 and chamber 16. By making the area of piston 19 greater than the area of passage 13, increased system pressure will close the valve tighter.

It should be noted that if the compressor oil pump does not build up pressure the suction service valve will not open and therefore the compressor will not develop capacity. This malfunction will then be noted by the operator and damage to the compressor will be prevented.

Referring particularly to Figure 3, there is disclosed the automatic discharge service valve 10. Valve 10 includes a housing 41 having a passage 42 therethrough that permits communication between the compressor discharge opening and the refrigeration system. A self-aligning valve disk or member 43 is located in the housing 41 which cooperates with port 43' to regulate the flow of refrigerant through the passage 42. A chamber 44 is disposed in the housing and is formed by front wall 45, back wall 46, cylindrical wall 47.

The disk or member 43 is connected to an element such as rod 53, which extends through aligning opening 54 in the front wall 45 of chamber 44. In this aligning opening 54 there is a seal 54' which prevents flow of gas from the compressor discharge passage to chamber 44. A plate 55 is connected to the end of the rod disposed in the chamber 44. The plate has a button 56 on the side remote from front wall 45. A piston 57 is placed in the chamber between the button 56 and the back wall 46. Between the front wall 45 and the plate 55, there is disposed a valve closing spring 58. The button 56 permits the piston 57 to be flexible with respect to the rod 15 but still to be capable of actuating the rod. The button eliminates the problem of alignment that would exist if the rod 15 were rigidly joined to piston 57.

An opening 62 is provided in the back wall 46 of the chamber connected by pipe 63 to the oil pump of the lubrication system to provide communication between the chamber and oil pump. An opening 64 is disposed in the cylindrical wall 47 at its juncture with front wall 45. This opening connects with pipe 65 which leads to the crankcase. The housing 41 is provided with a discharge pressure gauge connection 66 to which a pressure gauge, if desired, may be connected for the purposes of ascertaining the discharge pressure. Considering the operation of the automatic discharge service valve, the valve closing spring 58 acts against plate 55 to hold the member 43 in closed position so as to prevent communication between the compressor and the refrigeration system by means of passage 42 when the compressor is stopped.

When the compressor first starts, oil from the oil pump (not shown) of the compressor lubrication system is supplied to chamber 44 by means of pipe 63 through opening 62. This oil enters the chamber between the back wall 46 and piston 57. When the running speed of the compressor is attained, the force exerted against the piston 57 by the oil pressure is greater than the force exerted by spring 58 and the member 43 is moved to open position to permit the flow of a refrigerant from the compressor to the refrigeration system.

The opening 64 in the cylindrical wall 47 of the chamber serves as an equalizer. If any oil escapes around the piston 57 into the portion of the chamber containing the spring 58, this oil will escape through opening 64 and pipe 65 to the crankcase.

It will be appreciated from Figure 3 that the discharge service valve is so constructed as to be unseated when the internal compressor pressure is greater than the refrigerant system pressure by an amount greater than the force of spring 58. This valve, therefore, has the additional function of being a safety feature.

The safety feature of this automatic discharge service valve eliminates the necessity for using a conventional safety valve between the high pressure and low pressure sides of the compressor and protects the compressor from damage should it accidentally be started with the conventional discharge service valve closed. It will be understood that the safety valve is presently required with the manually operated discharge service valve.

Considering the operation of the refrigeration system, gaseous refrigerant is compressed in compressor 2 and flows through discharge line 6 to the condenser 3. It will be understood that the refrigerant flows through the discharge service valve 10 in line 6. The gaseous refrigerant is condensed in the condenser 3 and then passes through the expansion means 4 to the evaporator 5 where it is vaporized by absorbing heat and flows from the evaporator 5 to the compressor 2 through suction line 7. In passing through line 7, the refrigerant flows through the suction service valve 11.

When the compressor 2 is shut down, the pump of the compressor lubrication system stops and, of course, the oil pressure decreases. When the pressure decreases, the force of spring 24 in the suction service valve 11 is exerted through the piston 19 and rod 15 to move the member to close port 14' (and prevent passage of fluid through the passage 13.

Similarly, in the discharge service valve on the stopping of the pump of the compressor lubrication system, the spring 58 transmits its force through plate 55 and rod 53 to close port 43' and prevent passage of fluid through passage 42.

While the system described includes both valves, it will be understood that they may be used separately, if desired. It also is understood that the operation of one valve does not have any effect on the operation of the other valve in the same system.

The present invention lends itself readily to compressors already in use since the manually operated service valves may easily be replaced by my novel automtaic service valves. Protection against "flooded start-ups" without the use of extra equipment such as crankcase heaters is assured by the present invention.

While I have described a preferred embodiment of my invention, it will be understood that my invention is not limited thereto since it may be otherwise embodied within the scope of the following claims.

I claim:

1. In a refrigeration system, the combination of a compressor having a pressure lubrication system, a condenser, a discharge line connecting the compressor and the condenser, expansion means, an evaporator, a suction line connecting the evaporator and the compressor, a valve in the suction line adjacent the compressor to regulate the flow of refrigerant from the evaporator to the compressor, said valve including a housing having a port therein and a chamber disposed opposite the port, a member to close the port, an element connected to the member and extending into the chamber, a piston in said chamber connected to the element, yieldable means disposed in the chamber to act through the piston and the element to position the member in closed position, means for admitting the lubricant pressure of the compressor lubrication system to the chamber to act against the piston, the lubricant pressure against the piston being of sufficient force to move the member to open position against the resistance of the yieldable means, and means regulating the flow of refrigerant in the discharge line.

2. In a refrigeration system, the combination of a compressor having a pressure lubrication system, a condenser, a discharge line connecting the compressor and the condenser, expansion means, an evaporator, a suction line connecting the evaporator and the compressor, a valve in the discharge line adjacent the compressor to regulate the flow of refrigerant from the compressor to the condenser, said valve including a housing having a port therein and a chamber disposed opposite the port, a member to close the port, an element connected to the member and extending into the chamber, a plate in the chamber connected to the element, a button on the side of the plate opposite its connection to the element, yieldable means disposed in said chamber acting against said plate to hold the member in closed position, a piston in said chamber, means to admit the lubricant pressure of the compressor lubrication system to act against the piston, said piston acting through the button to move the member, the lubricant pressure against the piston being of sufficient force to move the member to open position against the resistance of the yieldable means, and means regulating the flow of refrigerant in the suction line.

3. In a refrigeration system, the combination of a compressor, a condenser, a discharge line connecting the compressor and the condenser, expansion means, an evaporator, a suction line connecting the evaporator and the compressor, a valve in the suction line adjacent the compressor to regulate the flow of refrigerant from the evaporator to the compressor, said valve including a housing having a port therein and a chamber disposed opposite the port, a member to close the port, an element connected to the member and extending into the chamber, a piston in said chamber connected to the element, yieldable means disposed in the chamber to act through the piston and the element to position the member in closed position, means for admitting the lubricant pressure of a compressor lubrication system to the chamber to act against the piston, the lubricant pressure against the piston being of sufficient force to move the member to open position against the resistance of the yieldable means, a valve in the discharge line adjacent the compressor to regulate the flow of refrigerant from the compressor to the condenser, said valve including a housing having a port therein and a chamber disposed opposite the port, a member to close the opening, an element connected to the member and extending into the chamber, a plate in the chamber connected to the element, said plate having a button on the side of the plate opposite its connection to the element, yieldable means disposed in said chamber and acting against said plate to hold the member in closed position, a piston in said chamber, means to admit the lubricant pressure of the compressor lubrication system to act against the piston, said piston acting through the button to move the member, the lubricant pressure against the piston being of sufficient force to move the member to open position against the resistance of the yieldable means.

4. In a refrigeration system, the combination of a compressor having a pressure lubrication system, a condenser, a discharge line connecting the compressor and the condenser, expansion means, an evaporator, a suction line connecting the compressor and the evaporator, a valve placed in said suction line, a valve placed in said discharge line, at least one of said valves including a housing having a passage therethrough, first means to close the passage, second means disposed in the housing to hold the first means in closed position and means in the housing responding to the lubricant pressure of the compressor lubrication system to move the first means to open position against the resistance of said second means.

5. In a refrigeration system, the combination of a compressor having a pressure lubrication system, a condenser, a discharge line connecting the compressor and the condenser, expansion means, an evaporator, a suction line connecting the compressor and the evaporator, a valve placed in said suction line and a valve placed in said discharge line, at least one of said valves including a housing having a passage therethrough, means for closing the passage, said housing having a chamber therein, means extending from the closing means into the chamber, a yieldable means in the chamber acting through the extending means to hold the closing means in closed position, a piston in the chamber, said piston acting through said extending means to move the closing means to open position, and means to apply lubricant pressure of the compressor lubrication system against the surface of the piston to move the closing means against the resistance of said yieldable means to open the passage.

6. In a refrigeration system the combination of a compressor having a pressure lubrication system, a condenser, an evaporator, expansion means, means operatively connecting the elements of said combination including a suction line connecting the evaporator and the compressor and a discharge line for connecting the condenser and the compressor, means placed in said suction line for regulating the flow of refrigerant therethrough responsive to lubricant pressure of the compressor lubrication system and means placed in said discharge line for regulating the flow of refrigerant therethrough responsive to lubricant pressure of the compressor lubrication system.

7. A refrigeration system according to claim 6 in which said last mentioned means is also at least partially responsive to refrigerant pressure in said connecting means.

References Cited in the file of this patent

UNITED STATES PATENTS

| Number | Name | Date |
|---|---|---|
| Re. 19,700 | Williams | Sept. 10, 1935 |
| 472,355 | Hoffman | Apr. 5, 1892 |
| 551,370 | Donnelly | Dec. 17, 1895 |
| 1,068,623 | Bodine | July 29, 1913 |
| 1,583,282 | Denny | May 4, 1926 |
| 1,768,602 | Hull | July 1, 1930 |
| 2,080,288 | McCormack | May 11, 1937 |
| 2,165,741 | Wolfert | July 11, 1939 |
| 2,296,304 | Wolfert | Sept. 22, 1942 |
| 2,387,117 | Buehler | Oct. 16, 1945 |
| 2,412,503 | Gerteis | Dec. 10, 1946 |
| 2,440,534 | Atchison | Apr. 27, 1948 |
| 2,575,719 | Leeds | Nov. 20, 1951 |
| 2,619,109 | Garrett et al. | Nov. 25, 1952 |
| 2,702,723 | MacDougall | Feb. 22, 1955 |

FOREIGN PATENTS

| 744,945 | France | Jan. 31, 1933 |